United States Patent
Foege

(10) Patent No.: US 11,835,135 B1
(45) Date of Patent: Dec. 5, 2023

(54) PISTON ASSEMBLY WITH WRIST PIN CAP

(71) Applicant: DeltaHawk Engines, Inc., Racine, WI (US)

(72) Inventor: Aaron Gamache Foege, Mount Pleasant, WI (US)

(73) Assignee: DeltaHawk Engines, Inc., Racine, WI (US)

( * ) Notice: Subject to any disclaimer, the term of this patent is extended or adjusted under 35 U.S.C. 154(b) by 0 days.

(21) Appl. No.: 17/851,840

(22) Filed: Jun. 28, 2022

(51) Int. Cl.
*F16J 1/18* (2006.01)

(52) U.S. Cl.
CPC ..................... *F16J 1/18* (2013.01)

(58) Field of Classification Search
CPC . F16J 1/18; F16J 1/16; B22D 19/0009; B22D 19/0027; B23P 15/10; F02B 55/02
See application file for complete search history.

(56) References Cited

U.S. PATENT DOCUMENTS

| | | | | |
|---|---|---|---|---|
| 1,511,135 A | * | 10/1924 | Moser | F16J 1/16 92/158 |
| 1,769,474 A | * | 7/1930 | Svenson | F16J 1/18 403/151 |
| 2,087,700 A | * | 7/1937 | Norton | F16J 1/06 29/888.044 |
| 2,257,236 A | * | 9/1941 | Hayden | F16J 1/04 92/158 |
| 2,386,117 A | * | 10/1945 | Hvid | F16J 9/08 92/186 |
| 2,849,266 A | * | 8/1958 | Glockl | F16B 21/10 403/155 |
| 4,796,517 A | * | 1/1989 | Akao | F02F 3/047 123/193.6 |
| 4,945,864 A | * | 8/1990 | Solomon | F01M 1/08 123/193.6 |
| 6,550,138 B2 | | 4/2003 | Billimack et al. | |
| 2019/0137151 A1 | * | 5/2019 | Mowers | F25B 31/023 |

FOREIGN PATENT DOCUMENTS

| | | | | |
|---|---|---|---|---|
| DE | 4314892 B4 | * | 4/2004 | ................. F16J 1/18 |
| DE | 102006035178 A1 | * | 8/2007 | ................. F02F 3/00 |
| EP | 2746622 A1 | * | 6/2014 | ................. F16J 1/18 |
| KR | 20100102782 | * | 9/2010 | ............. B23P 15/10 |

OTHER PUBLICATIONS

KR 20100102782 English Translation (Year: 2010).*
EP 2746622 English Translation (Year: 2014).*

* cited by examiner

*Primary Examiner* — George C Jin
*Assistant Examiner* — Teuta B Holbrook
(74) *Attorney, Agent, or Firm* — Reinhart Boerner Van Deuren s.c.

(57) ABSTRACT

A wrist pin cap for a piston. The wrist pin cap is configured to form an interference fit with the piston. In specific embodiments, the wrist pin cap is positioned within the piston adjacent to an end of a wrist pin. In certain specific embodiments, the wrist pin cap is configured to form an interference fit with a counterbore of the piston. Some specific embodiments include a method for shrink fitting a wrist pin cap within a piston. In more specific embodiments, the wrist pin cap is shrunk by an application of liquid nitrogen.

20 Claims, 8 Drawing Sheets

PISTON ASSEMBLY WITH WRIST PIN CAP

BACKGROUND OF THE INVENTION

The present invention relates generally to the field of engines. The present invention relates specifically to pistons for two-stroke diesel engines and wrist pin components thereof.

SUMMARY OF THE INVENTION

One embodiment of the invention relates to a piston assembly for use within a two-stroke diesel engine cylinder. The piston assembly includes a piston, a wrist pin, and a first wrist pin cap. The piston is configured to travel within the cylinder. Additionally, the piston has a substantially cylindrical shape and defines a substantially cylindrical cavity. The wrist pin also has a substantially cylindrical shape that includes a first longitudinal end and a second longitudinal end. The wrist pin is positioned within the substantially cylindrical cavity of the piston. The first wrist pin cap is secured within the substantially cylindrical cavity of the piston and is positioned adjacent to the first longitudinal end of the wrist pin.

Another embodiment of the invention relates to a piston assembly for use within a two-stroke diesel engine cylinder. The piston assembly includes a piston, a wrist pin, and a wrist pin cap. The piston has a substantially cylindrical shape and defines a substantially cylindrical cavity. A wrist pin bearing is positioned within the substantially cylindrical cavity. Further, a counterbore is formed within the substantially cylindrical cavity adjacent to the wrist pin bearing. The wrist pin is positioned within the wrist pin bearing. The wrist pin has a first longitudinal end and a second longitudinal end. Additionally, a wrist pin cap is secured within the counterbore.

Another embodiment of the invention relates to a method of securing a wrist pin cap for use within a two-stroke diesel engine cylinder. The method includes providing a wrist pin, a wrist pin cap having a substantially cylindrical shape, and a piston having a wrist pin bearing configured to receive and support the wrist pin. The piston defines a counterbore configured to receive and support the wrist pin cap adjacent to the wrist pin. The method further includes positioning the wrist pin within the piston, such that the wrist pin is supported by the wrist pin bearing. Additionally, the method includes shrink fitting the wrist pin cap within the counterbore.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring to FIGS. 1-10, various views of a piston assembly with a wrist pin cap are shown. The piston forms a cylindrical cavity that supports a wrist pin bearing, with a counterbore formed on either side of the wrist pin bearing. The wrist pin bearing receives and supports a wrist pin. The piston assembly is designed to travel within the cylinder of a diesel engine. As the piston is traveling within the cylinder, hot spots can form between the wrist pin and the wrist pin bearing, resulting in damage and/or increased wear to the wrist pin and/or wrist pin bearing. To reduce the number of hot spots formed during piston travel, Applicant has found it beneficial to shrink fit a wrist pin cap within each counterbore. This provides an interference fit between the wrist pin cap and the piston, which greatly increases the stiffness of both the piston and the wrist pin bearing.

Figure 1:
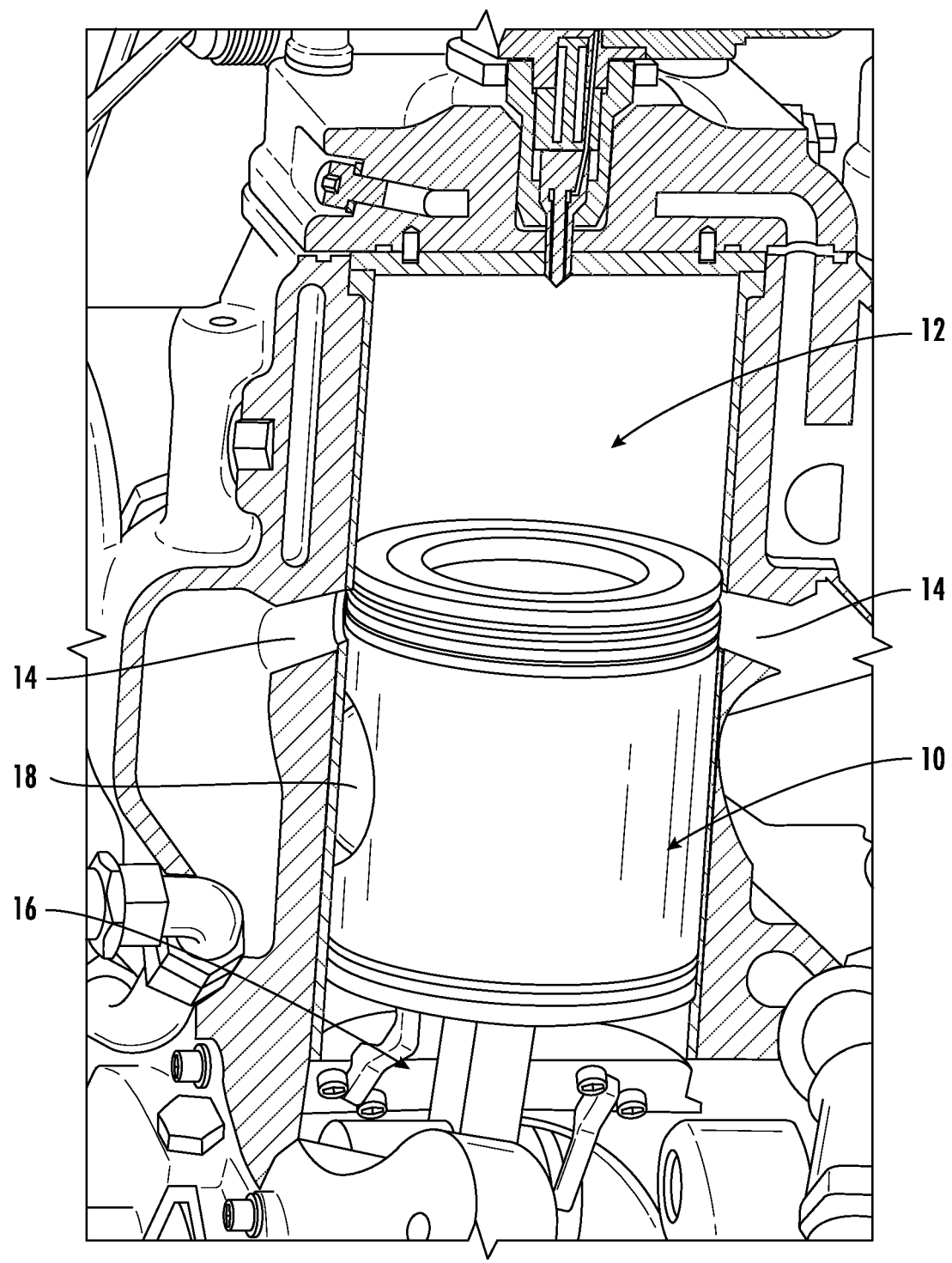
FIG. 1 is a perspective cutaway view of an engine cylinder to show a piston housed within the cylinder, according to an exemplary embodiment.
Figure 1A:
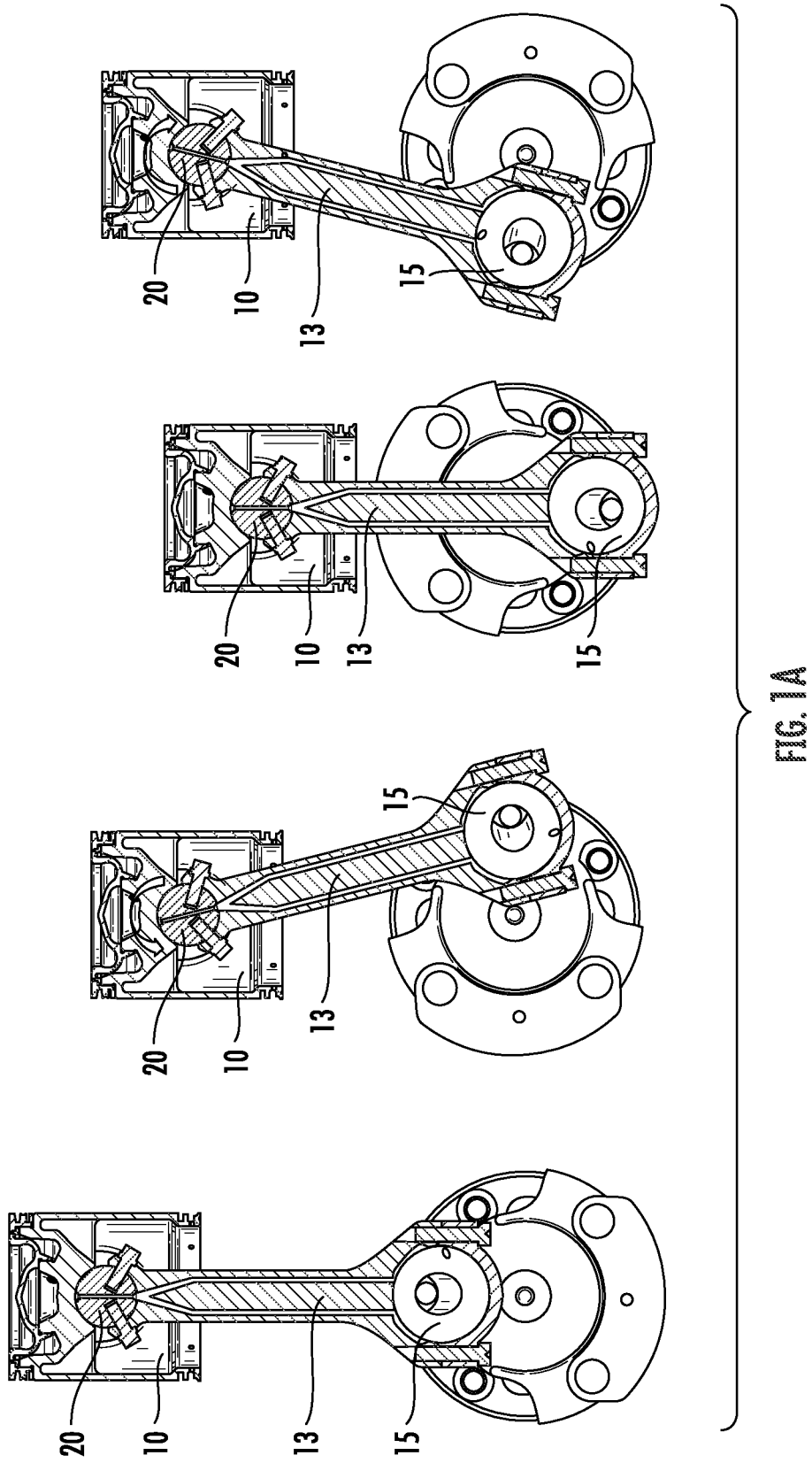
FIG. 1A shows a series of cross-sectional views of the piston shown in FIG. 1 being driven to various positions by a connecting rod coupled to a crankshaft, according to an exemplary embodiment.

Referring to FIG. 1, a piston 10 is shown housed within a cylinder 12. As shown in FIG. 1, cylinder 12 is a cylinder of a two-stroke diesel engine. In FIG. 1, cylinder 12 is shown in a conventional V-block configuration. However, in other specific embodiments, cylinder 12 is oriented in an inverted V-block configuration, otherwise known as an A-block configuration. Further, as shown in FIG. 1, cylinder 12 includes a single piston. However, in other specific embodiments, cylinder 12 includes a plurality of pistons arranged in an opposed piston configuration. As shown in FIG. 1, piston 10 reciprocates within cylinder 12, driven by a connecting rod 13. Within cylinder 12, piston 10 moves past ports 14, until it reaches the top, specifically the furthest point, of its stroke, otherwise known as top dead center (TDC). Combustion pressures then force piston 10 to travel back in the opposite direction within cylinder 12, toward crankcase 16. Referring to FIG. 1A, a series of cross sections are shown of piston 10 being driven between various positions by connecting rod 13. Connecting rod 13 is coupled to a wrist pin 20 positioned within piston 10, as well as to a rotating crankshaft 15. Wrist pin 20 is free to rotate within piston 10, but is fixed against rotation with respect to connecting rod 13. As crankshaft 15 rotates, connecting rod 13 acts as a link between the revolution of crankshaft 15 and the reciprocating movement of piston 10. As such, the rotation of crankshaft 15 generates an oscillatory motion of the connecting rod 13. This, in turn, causes wrist pin 20 to oscillate, specifically to rock back and forth, with respect to piston 10, as piston 10 reciprocates.

In certain types of engines, such as four-stroke diesel engines, at the time the piston switches direction at TDC, wrist pin 20 can establish sufficient clearance with respect to piston 10 to allow a squeeze film of oil to spread between wrist pin 20 and piston 10, generating a hydrodynamic bearing between wrist pin 20 and the piston 10. However, in a two-stroke diesel engine, the forces generated from the combustion pressures are greater than the inertial forces from the deceleration of piston 10 as it approaches TDC, such that wrist pin 20 does not gain sufficient clearance with respect to piston 10 to generate a hydrodynamic bearing as piston 10 switches direction at TDC. As such, a wrist pin, such as wrist pin 20, positioned within a two-stroke diesel engine piston, such as piston 10, can be subject to greater wear than a wrist pin positioned within a four-stroke diesel engine piston.

Figure 2:
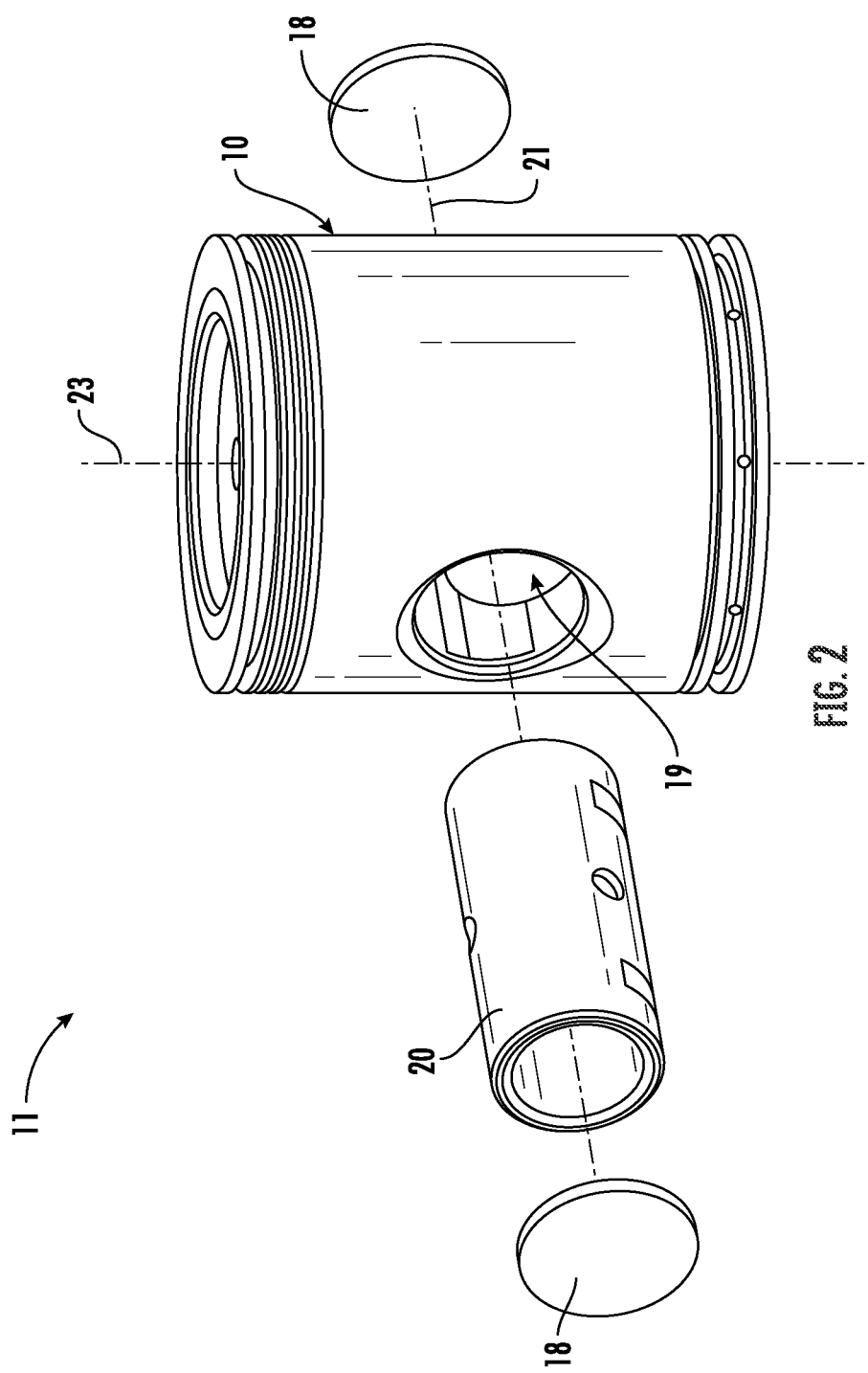
FIG. 2 is an exploded view of a piston assembly, according to an exemplary embodiment.
Figure 3:
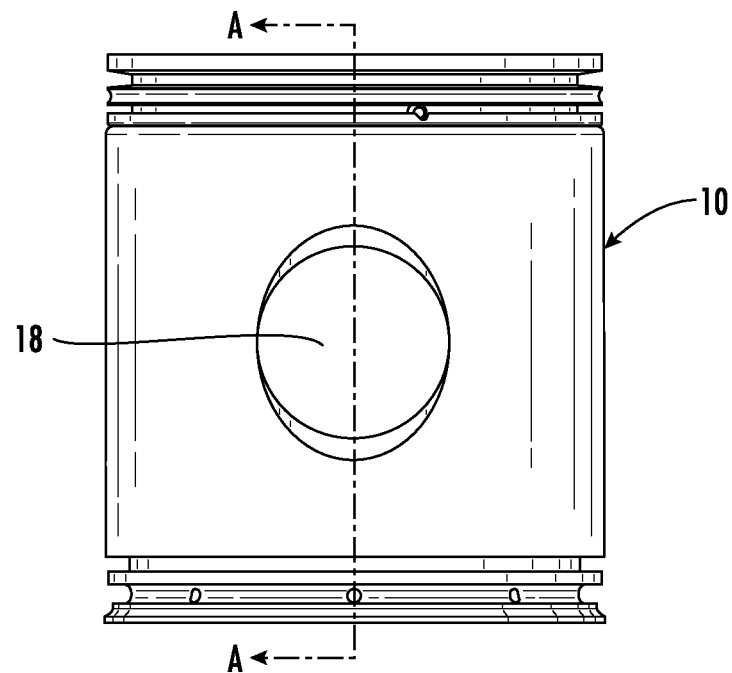
FIG. 3 is a front view of the piston assembly shown in FIG. 2, according to an exemplary embodiment.
Figure 4:
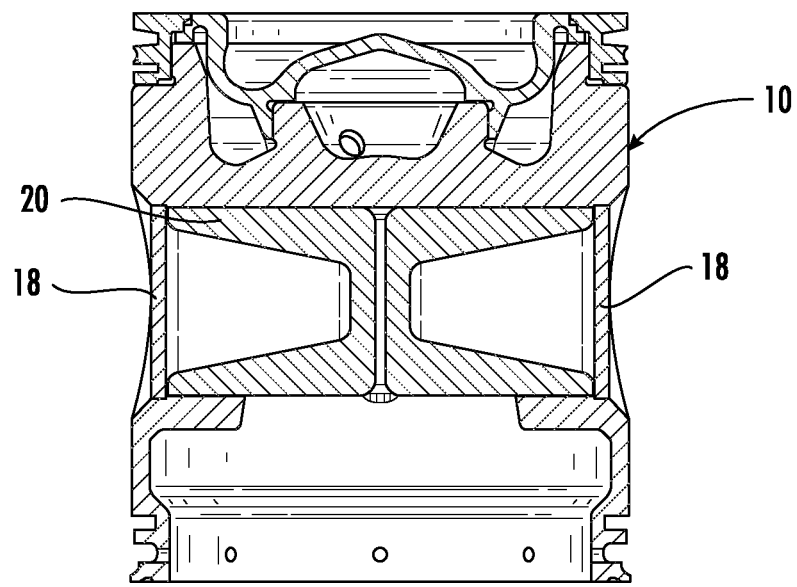
FIG. 4 is a cross sectional view of the piston assembly shown in FIG. 3, taken along line A-A, according to an exemplary embodiment.

Referring to FIGS. 2-4, various views of a piston assembly 11 including piston 10, wrist pin 20, and a plurality of wrist pin caps 18, are shown. As shown in FIG. 2, piston 10 is substantially cylindrical and defines a substantially cylindrical cavity 19 for receiving wrist pin 20, which is also substantially cylindrical. In specific embodiments, substantially cylindrical cavity 19, wrist pin 20, and wrist pin caps 18 share a common central axis 21. In some specific embodiments, piston 10 has a longitudinal axis 23 that is perpendicular to common central axis 21. In specific embodiments, wrist pin caps 18 are each formed of a rigid material, such as 6061-T6 Aluminum, 4031 Aluminum, or 954 Bronze. Upon assembly, wrist pin 20 is positioned within the substantially cylindrical cavity 19 formed in piston 10. Wrist pin caps 18 are then positioned within substantially cylindrical cavity 19, each adjacent to an opposite longitudinal end of wrist pin 20.

Figure 5:
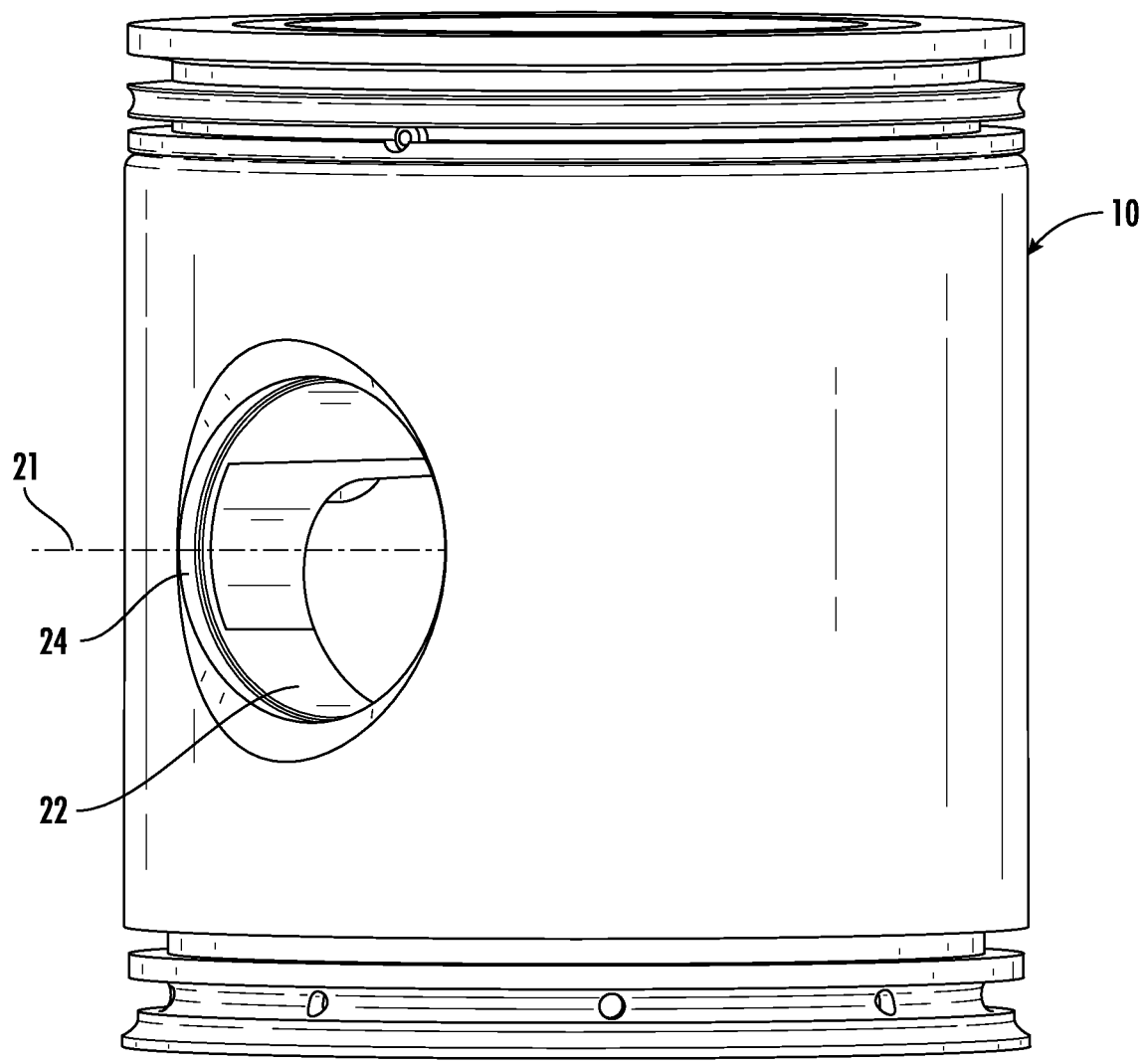
FIG. 5 is a perspective view from the front of the piston shown in FIG. 2, according to an exemplary embodiment.

Referring to FIG. 5, piston 10 is shown in greater detail. As shown in FIG. 5, piston 10 includes a wrist pin bearing 22 that is configured to receive and support wrist pin 20 within piston 10. Additionally, a counterbore 24 is formed adjacent to wrist pin bearing 22. Counterbore 24 is configured to receive and support wrist pin cap 18 within piston 10. Wrist pin bearing 22 and counterbore 24 share the same common central axis 21 as wrist pin 20 and wrist pin caps 18 (as shown in FIG. 2 above). In certain specific embodiments, wrist pin bearing 22 is coupled to piston 10. In other specific embodiments, wrist pin bearing 22 is an integrally formed surface of piston 10.

Figure 6:
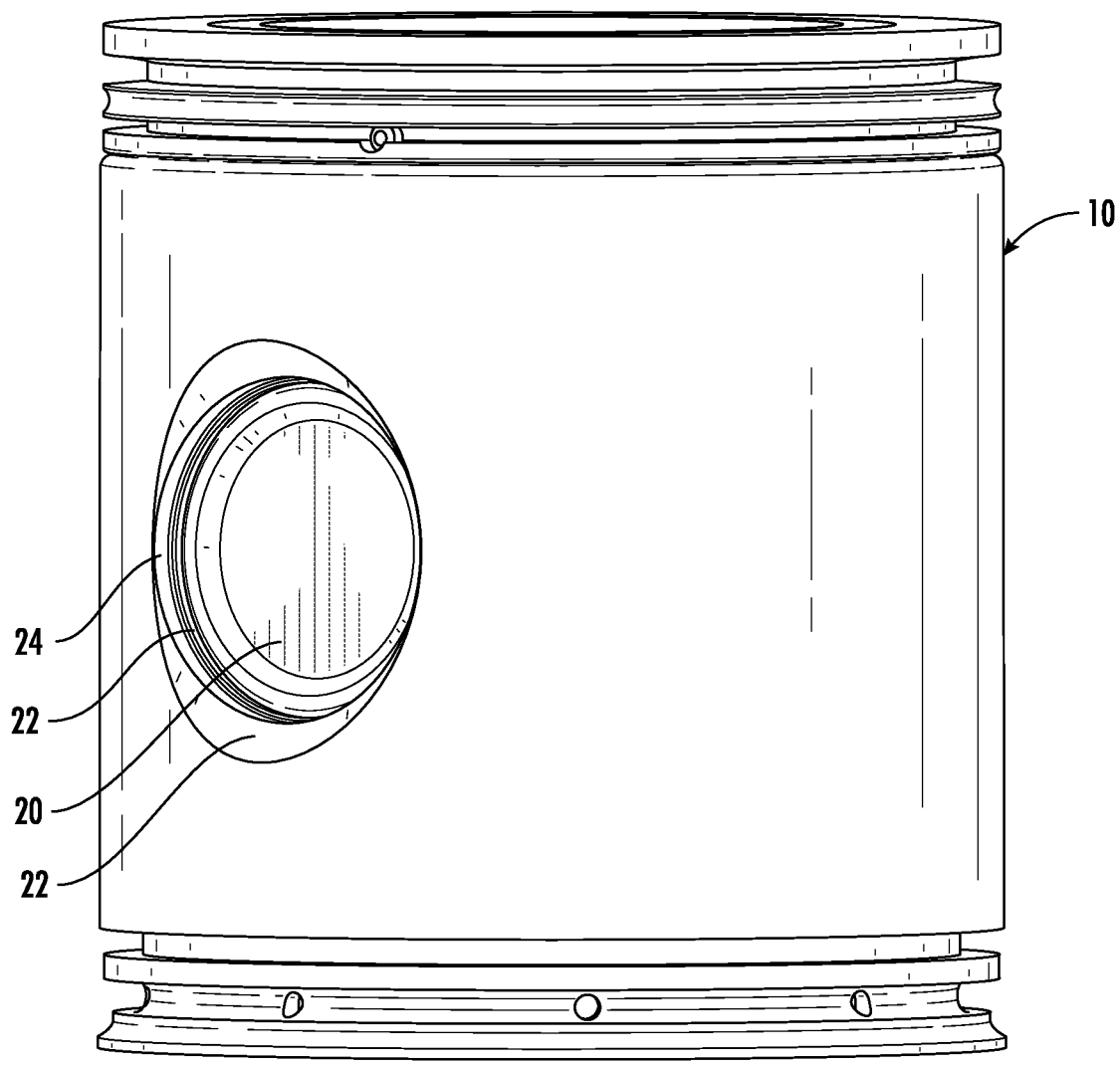
FIG. 6 is a perspective view from the front of the piston and wrist pin shown in FIG. 2, according to an exemplary embodiment.
Figure 7:
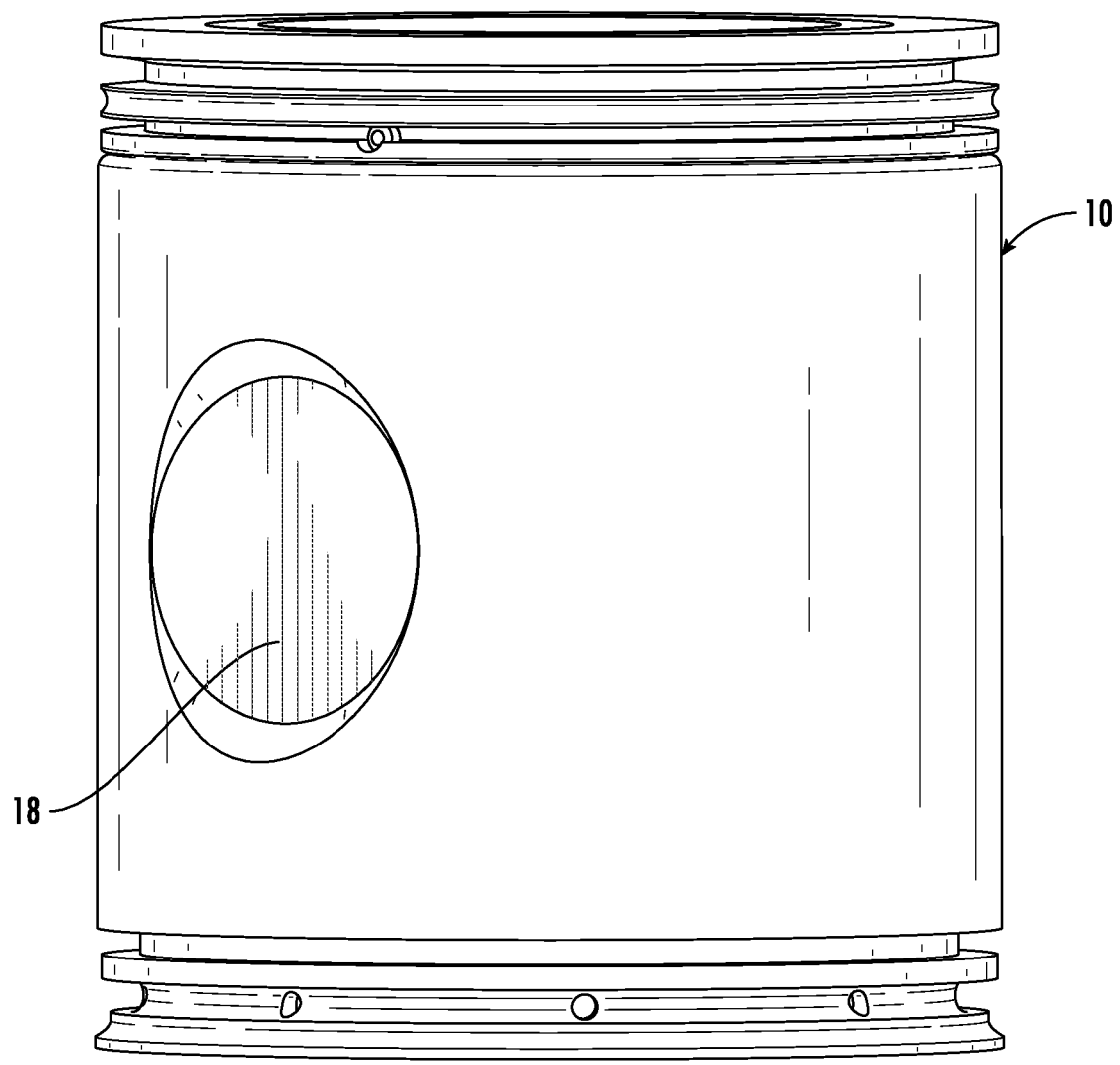
FIG. 7 is a perspective view from the front of the piston and one of the wrist pin caps shown in FIG. 2, according to an exemplary embodiment.

FIG. 6 shows wrist pin 20 inserted within piston 10. In specific embodiments, wrist pin 20 is supported by wrist pin bearing 22 (shown in FIG. 5). As shown in FIG. 6, when wrist pin 20 is positioned within piston 10, counterbore 24, positioned adjacent to wrist pin bearing 22, remains configured to receive wrist pin cap 18. Specifically, counterbore 24 extends sufficiently beyond wrist pin 20 to receive wrist pin cap 18. Referring to FIG. 7, wrist pin cap 18 is shown inserted within piston 10. Specifically, wrist pin cap 18 is received and supported by counterbore 24 (shown in FIGS. 5-6). Though the views of piston 10 shown in FIGS. 2-3 and 5-7 illustrate the front side of piston 10, the rear side of piston 10 is substantially the same as the front side of piston 10 shown.

In specific embodiments, one of the wrist pin caps 18 is shrink fit within each counterbore 24. Specifically, when wrist pin cap 18 is approximately room temperature, the diameter of wrist pin cap 18 is equal to or greater than the diameter of counterbore 24. To shrink fit wrist pin cap 18 within counterbore 24 of piston 10, wrist pin cap 18 is cooled until the diameter of wrist pin cap 18 is smaller than the diameter of counterbore 24. In specific embodiments, wrist pin cap 18 is cooled to a temperature below −150 degrees Fahrenheit. In certain specific embodiments, the cooling of wrist pin cap 18 during the shrink fitting process is achieved through an application of liquid nitrogen.

Wrist pin cap 18 is then positioned within counterbore 24. As discussed above, when wrist pin cap 18 is positioned within counterbore 24, wrist pin cap 18 and counterbore 24 share the common central axis 21 (shown in FIGS. 2 and 5). In some specific embodiments, when wrist pin cap 18 is initially positioned within counterbore 24, approximately 0.003-0.006 inches of clearance is established between the exterior circumferential surface of wrist pin cap 18 and the corresponding surface of counterbore 24. As the temperature of wrist pin cap 18 rises toward room temperature, the size of wrist pin cap 18 expands until a secure shrink fit is established between wrist pin cap 18 and counterbore 24. When the secure shrink fit is established, the outer circumferential surface of wrist pin cap 18 at least in part abuts the surface of counterbore 24.

Alternatively, in certain specific embodiments, the shrink fitting process is achieved by heating piston 10, rather than by cooling wrist pin cap 18. In such embodiments, heat is applied to piston 10 until the diameter of counterbore 24 is enlarged sufficiently to receive wrist pin cap 18 when wrist pin cap 18 is at room temperature. Once wrist pin cap 18 is positioned within counterbore 24 as described above, piston 10 is then allowed to return to room temperature, contracting until a secure shrink fit is established between wrist pin cap 18 and counterbore 24. In other alternative embodiments, wrist pin caps 18 are secured by means of shrink fitting within a wrist pin bearing at opposite longitudinal ends of a wrist pin, rather than within a counterbore.

In a two-stroke diesel engine, wrist pin bearings, such as wrist pin bearing 22, operate in boundary lubrication, where the wrist pin loads are supported by a mix of oil pressure and metal-to-metal contact between wrist pin 20 and wrist pin bearing 22. Boundary lubricated bearings are extremely sensitive to distortion. When wrist pin bearing 22 distorts, non-circular points of wrist pin bearing 22 that are distorted toward the wrist pin become hot spots where additional load is transmitted through the metal-to-metal contact between wrist pin bearing 22 and wrist pin 20.

When wrist pin caps 18 are secured within piston 10, wrist pin caps 18 each establish an interference fit with piston 10, greatly increasing the stiffness of piston 10 and wrist pin bearing 22, respectively. This interference fit decreases the distortion of wrist pin bearing 22 while piston 10 is in use, and thus, decreases the number of hot spots formed between wrist pin 20 and wrist pin bearing 22. As such, the use of wrist pin caps 18, as described herein, decreases the amount of wear applied to wrist pin bearing 22 and wrist pin 20 over a given number of strokes. In particular, Applicant has found a shrink-fit wrist pin cap, such as wrist pin cap 18, to provide a higher interference fit than other forms of wrist pin caps known in the art, such as wrist pin caps that are tapped into position by a laterally applied forces, such as the force of a hammer to the planar surface of the wrist pin cap.

Figure 8:
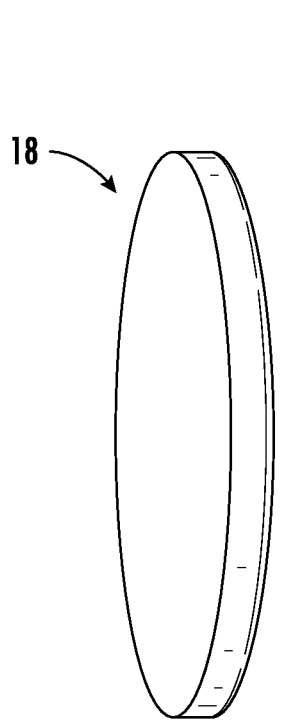
FIG. 8 is a perspective view from the front of one of the wrist pin caps shown in FIG. 2, according to an exemplary embodiment.
Figure 9:
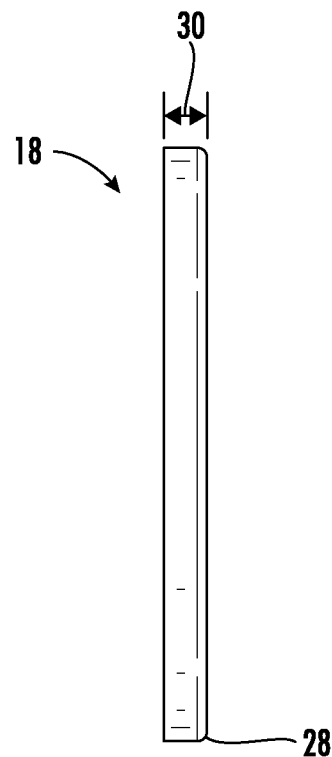
FIG. 9 is a side view of the wrist pin cap shown in FIG. 8, according to an exemplary embodiment.
Figure 10:
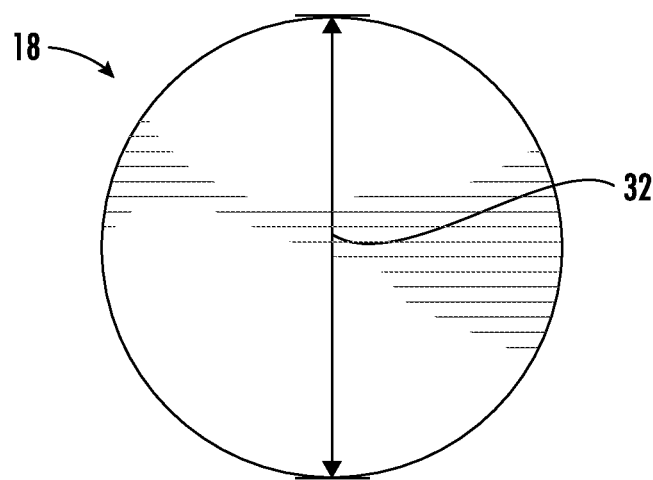
FIG. 10 is a front view of the wrist pin cap shown in FIG. 8, according to an exemplary embodiment.

Referring to FIGS. 8-10, wrist pin cap 18 is shown in greater detail. In specific embodiments, when at room temperature, wrist pin cap 18 has a width 30 of 0.120 inches. In certain specific embodiments, wrist pin cap 18 includes a circumferential taper 28 on an interior side, i.e., the side of wrist pin cap 18 that faces the interior of piston 10 when wrist pin cap 18 is positioned within piston 10. Further, in specific embodiments, when at room temperature, wrist pin cap 18 has a diameter 32 of 1.5528±0.0004 inches. In certain specific embodiments, when wrist pin cap 18 is cooled by liquid nitrogen during the shrink fitting process, diameter 32 is reduced in size by approximately 0.010 inches, and in one specific embodiment, is reduced in size to 1.5449 inches. Referring to the general shape of wrist pin cap 18, in specific embodiments, wrist pin cap 18 is substantially cylindrical, and the width 30 is smaller than the diameter 32. In more specific embodiments, the width 30 is less than 25% the diameter of wrist pin cap 18, when wrist pin cap 18 is at room temperature, and in more specific embodiments, is less than 10% of the diameter of wrist pin cap 18 when wrist pin cap 18 is at room temperature.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A piston assembly for use within a two-stroke diesel engine cylinder, the piston assembly comprising:
    a piston configured to travel within the cylinder, the piston having a substantially cylindrical shape, and the piston defining a substantially cylindrical cavity;
    a wrist pin having a substantially cylindrical shape that includes a first longitudinal end and a second longitudinal end, the wrist pin positioned within the substantially cylindrical cavity of the piston;
    a first wrist pin cap secured within the substantially cylindrical cavity of the piston, the first wrist pin cap positioned adjacent to the first longitudinal end of the wrist pin; and
    wherein the first wrist pin cap is shrink fit within the substantially cylindrical cavity of the piston.

2. The piston assembly of claim 1, wherein the first wrist pin cap is substantially cylindrical having a diameter and a width.

3. The piston assembly of claim 2, wherein the width of the first wrist pin cap is smaller than the diameter of the first wrist pin cap.

4. The piston assembly of claim 2, wherein the width of the first wrist pin cap is less than 10% of the diameter of the first wrist pin cap.

5. The piston assembly of claim 2, wherein the diameter of the first wrist pin cap is between 1.5 to 1.6 inches and the width of the first wrist pin cap is 0.120 inches.

6. The piston assembly of claim 1, wherein the first wrist pin cap and the wrist pin share a common central axis.

7. The piston assembly of claim 1, wherein a longitudinal axis of the piston is perpendicular to a central axis of the substantially cylindrical cavity of the piston, and wherein the wrist pin and the substantially cylindrical cavity of the piston share a common central axis.

8. The piston assembly of claim 1, further comprising a second wrist pin cap that is shrink fit within the substantially cylindrical cavity of the piston, the second wrist pin cap positioned adjacent to the second longitudinal end of the wrist pin.

9. The piston assembly of claim 1, wherein, when the first wrist pin cap and the piston are at room temperature, first wrist pin cap has a diameter greater that the diameter of the substantially cylindrical cavity.

10. The piston assembly of claim 1, further comprising a wrist pin bearing positioned within the substantially cylindrical cavity, wherein the wrist pin is positioned within the wrist pin bearing, and wherein the first wrist pin cap is adjacent to the cylindrical cavity.

11. A piston assembly for use within a two-stroke diesel engine cylinder, the piston assembly comprising:
   a piston having a substantially cylindrical shape, the piston defining a substantially cylindrical cavity, and the piston comprising:
      a wrist pin bearing positioned within the substantially cylindrical cavity, and
      a counterbore formed within the substantially cylindrical cavity adjacent to the wrist pin bearing;
   a wrist pin positioned within the wrist pin bearing, the wrist pin having a first longitudinal end and a second longitudinal end;
   a wrist pin cap secured within the counterbore; and
   wherein the wrist pin cap forms an interference fit with the counterbore.

12. The piston assembly of claim 11, wherein the wrist pin cap is shrink fit within the counterbore.

13. The piston assembly of claim 11, wherein a width of the wrist pin cap is less than 10% of a diameter of the wrist pin cap.

14. A method of securing a wrist pin cap for use within a two-stroke diesel engine cylinder, comprising:
   providing a wrist pin, a wrist pin cap having a substantially cylindrical shape, and a piston having a wrist pin bearing configured to receive and support the wrist pin, the piston defining a counterbore configured to receive and support the wrist pin cap adjacent to the wrist pin;
   positioning the wrist pin within the piston, such that the wrist pin is supported by the wrist pin bearing; and
   shrink fitting the wrist pin cap within the counterbore.

15. The method of claim 14, wherein the step of shrink fitting the wrist pin cap further comprises the steps of cooling the wrist pin cap until a diameter of the wrist pin cap is smaller than a diameter of the counterbore, positioning the wrist pin cap within the counterbore, and allowing the wrist pin cap to return to room temperature, expanding to form a secure shrink fit with the counterbore.

16. The method of claim 15, wherein the step of cooling the wrist pin cap further comprises cooling the wrist pin cap to a temperature below −150 degrees Fahrenheit.

17. The method of claim 15, wherein the step of cooling the wrist pin cap further comprises cooling the wrist pin cap until the diameter of the wrist pin cap has shrunk by approximately 0.010 inches.

18. The method of claim 15, wherein the step of cooling the wrist pin cap further comprises applying liquid nitrogen to the wrist pin cap until the diameter of the wrist pin cap has shrunk by at least 0.010 inches.

19. The method of claim 15, wherein the step of positioning the wrist pin cap within the counterbore includes aligning the wrist pin cap, such that the wrist pin cap, the counterbore and the wrist pin share a common central axis.

20. The method of claim 14, wherein the step of shrink fitting the wrist pin cap further comprises the steps of heating the piston until a diameter of the counterbore is larger than a diameter of the wrist pin cap, positioning the wrist pin cap within the counterbore, and allowing the piston to return to room temperature, contracting to form a secure shrink fit between the wrist pin cap and the counterbore.

* * * * *